Figure 3:
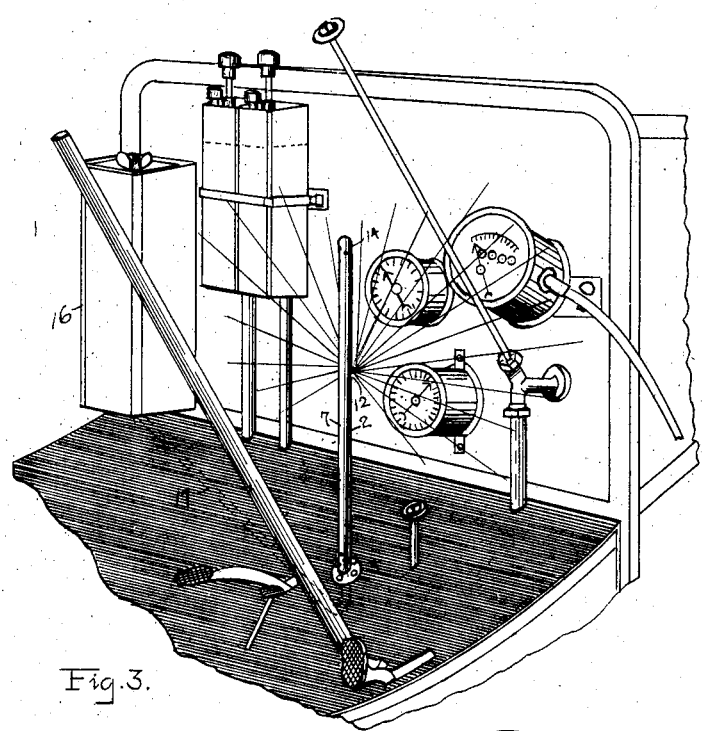

No. 834,572. PATENTED OCT. 30, 1906.
W. C. GREENE.
ACETYLENE DASH LAMP.
APPLICATION FILED APR. 14, 1906.

Witnesses:
R. L. Wallace
G. T. Foster

Inventor
Will C. Greene,
By Harry De Wallace
Attorney.

THE NORRIS PETERS CO., WASHINGTON, D. C.

UNITED STATES PATENT OFFICE.

WILL C. GREENE, OF WATERTOWN, NEW YORK.

ACETYLENE DASH-LAMP.

No. 834,572.  Specification of Letters Patent.  Patented Oct. 30, 1906.

Application filed April 14, 1906. Serial No. 311,632.

*To all whom it may concern:*

Be it known that I, WILL C. GREENE, a citizen of the United States, residing at Watertown, in the county of Jefferson and State of New York, have invented certain new and useful Improvements in Acetylene Dash-Lamps, of which the following is a specification.

This invention relates to improvements in acetylene dash-lamps designed for use in connection with automobiles and like vehicles to throw a suitable light upon the various gages and lubricators carried by such vehicles when running in the night-time.

The object of the invention is to provide a simple, durable, and inexpensive lamp which may be placed on an automobile at any convenient position behind the dashboard and which may be so disposed that it will cast a bright light upon the gages and other devices used in operating vehicles or cars of the class and at the same time not throw any rays of light or glare in the driver's or occupants' faces to blind or interfere with their view ahead.

A further object is to provide a lamp which has but a few parts, may be readily and cheaply installed, and which may be maintained as a lighting instrument at a trifling cost.

Acetylene gas either in the "condensed" form, so called or that which is made directly from generators carried by automobiles has been employed to a considerable extent for lighting headlights, side lights, and also for search-lights on this class of vehicles; and my invention contemplates using the same element for lighting up the rear side of the dash. For that purpose I have devised the lamp set forth in the detailed description which follows, and which is illustrated in the drawings forming a part of this specification, in which—

Figure 2:
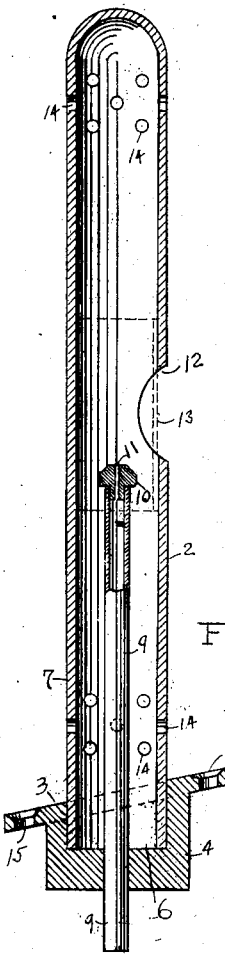
Figure 4:
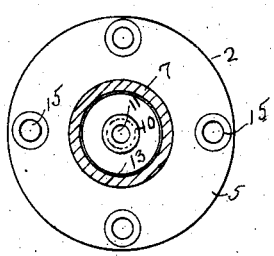
Figure 1:
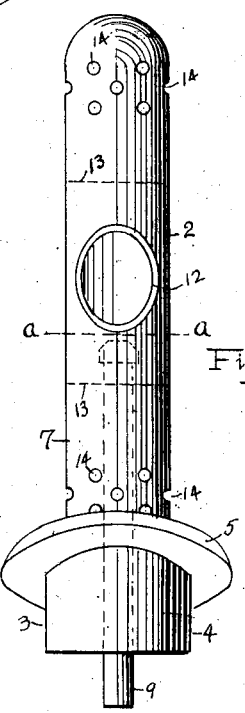
Figure 5:
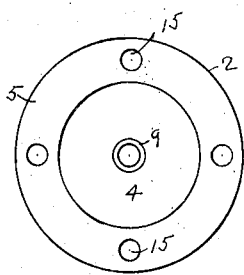

Figure 1 is a view in elevation of my improved dash-lamp. Fig. 2 is an enlarged vertical section of the lamp, showing the manner of construction and arranging the several parts. Fig. 3 is a view of a part of an automobile having my dash-lamp applied. Fig. 4 is a sectional view of the lamp, substantially on the line *a a* of Fig. 1. Fig. 5 is an inverted plan view of the lamp.

Similar reference-numerals are assigned to corresponding parts throughout the several views.

In the drawings, 2 represents my dash-lamp, which is preferably made of brass, which for durability and ornamental effect has proven the most serviceable material.

3 represents the base, which is composed of the cylindrical part 4, and the flange 5, which is formed on its upper side or face, the latter being for use in securing the lamp to the floor or other parts of the vehicle. The base 3 is provided with a socket 6, into which is fitted the detachable tubular shade or shield 7. The latter part serves the purpose of a chimney and is intended to fit socket 6 tightly enough to hold it in place without any other securing means.

9 represents a small tube which passes through and is fitted rigidly to the base, as shown in Fig. 2. This tube extends a short distance below the base 3 to facilitate attaching a small rubber tube or other suitable supply-pipe, through which the gas flows to the lamp. The upper end of tube 9 is fitted with a burner, preferably a lava tip 10, which is provided with a small central opening or vent 11. The shielding-tube 7 is provided on one side with an oval-shaped opening 12, and this is disposed a short distance above the burner-tip, as also shown in Fig. 2. As the acetylene gas employed for lighting automobiles is burned under considerable pressure, it has been found that the best results for lighting purposes from my lamp are obtained by placing the burner slightly below the opening 12, for the reason that the flame shoots upwardly from the burner for some distance, and the most brilliant portion of it will then be directly opposite the center of opening 12. Under this construction and disposition of the parts the rays of light from the lamp show through the opening 12 and are thrown over a large area of the dash, as shown in Fig. 3.

In order to protect the light from being extinguished by drafts entering the opening 12, I place a thin sheet of mica 13 inside the tube 7 in such a manner that it completely closes the opening 12, but being transparent and impervious to heat does not lessen the power or efficiency of the lamp for lighting purposes. The mica shield 13 is rolled into tubular shape and inserted in tube 7, and when it expands it will remain in place without any fastening means. The position of the mica is shown by dotted lines in Figs. 1 and 2 and in full lines, Fig. 4. The tube 7 is provided at or near each end with a series of small perforations 14, the object of these perforations being to furnish ventilation and suitable draft to cause the gas to burn steady and brilliantly.

To light my lamp or to adjust or replace the burner-tip, the tube 7 is removed from the socket 6 and then put back in place.

My dash-lamp is usually applied in the manner illustrated in Fig. 3 by cutting a hole through the floor of the vehicle and inserting the cylindrical portion of the base in said opening and then securing it in such a position by means of screws which pass through the holes 15 in flange 5.

16 represents an acetylene-gas generator or tank which is carried on the vehicle, as shown in Fig. 3, and the gas is conducted from it to the lamp by means of a tube 17, either flexible or otherwise, which extends from the generator or tank beneath the floor of the auto and connects with the small tube 9 of the lamp, as shown by the dotted lines in Fig. 3.

It is obvious that the several parts comprising my dash-lamp may be varied within the scope defined by the appended claims, and I therefore do not restrict myself to the precise construction described and shown herein.

Having thus described my invention, what I claim as new, and desire to secure by Letters Patent, is—

1. An acetylene-lamp of the class described, comprising a suitable base, a tube extending upwardly through the center of said base, a burner fitted to the upper end of said tube, a perforated tubular shield fitting in a socket in said base and surrounding said tube and burner, and a transparent substance closing the larger of said perforations, substantially as described.

2. In a lamp of the class described, the combination with a base, having a flange and a socket on its upper side, of a tube extending upwardly through said base and socket, a burner comprising a detachable tip secured to the upper end of said tube, a hollow metallic shield inclosing the portion of said tube which extends above said base, said shield having a large opening through which the light from said burner shines and having a series of small perforations at or near the top and bottom thereof to provide ventilation for said burner, and a transparent substance within said shield to close said opening, substantially as described.

3. An acetylene-lamp of the class described, comprising a suitable base, a hollow shield or shade fitting into a socket formed in the upper side of said base, a tube extending upwardly through said base and within said shield or shade, a burner mounted on the upper end of said tube, an oval-shaped perforation in said shield or shade through which the light from said burner shines, a lining of mica disposed within said shield or shade adapted to close said perforation, and a series of small holes at or near each end of said shield or shade, substantially as described.

4. In a lamp of the class described, the combination with a base adapted for attaching said lamp to an automobile, a gas-tube passing upwardly through said base, a socket formed in said base, a hollow metallic shade or shield fitting said socket and concealing the upper end of said gas-tube, a burner or tip secured to the upper end of said gas-tube, a hole in said shade or shield through which the light from said burner or tip shines, a mica lining in said shade or shield adapted to close said hole, and a series of perforations at each end of said shade or shield, substantially as described.

In testimony whereof I affix my signature in presence of two witnesses.

WILL C. GREENE.

Witnesses:
EDGAR V. B. SORDOUGH,
HARRY DE WALLACE.